(12) United States Patent
Hohmann, Jr.

(10) Patent No.: US 8,910,445 B2
(45) Date of Patent: Dec. 16, 2014

(54) THERMALLY ISOLATED ANCHORING SYSTEM

(71) Applicant: Mitek Holdings, Inc., Wilmington, DE (US)

(72) Inventor: Ronald P. Hohmann, Jr., Hauppauge, NY (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 13/800,299

(22) Filed: Mar. 13, 2013

(65) Prior Publication Data

US 2014/0260051 A1    Sep. 18, 2014

(51) Int. Cl.
*E04B 1/02*       (2006.01)
*E04B 1/41*       (2006.01)

(52) U.S. Cl.
CPC .................................. *E04B 1/4185* (2013.01)
USPC ......................................................... 52/565

(58) Field of Classification Search
USPC ........... 52/379, 378, 380, 381, 383, 426, 652, 52/656, 167.1, 698, 699, 712, 713
See application file for complete search history.

(56) References Cited

U.S. PATENT DOCUMENTS

| | | | |
|---|---|---|---|
| 819,869 | A | 5/1906 | Dunlap |
| 903,000 | A | 11/1908 | Priest, Jr. |
| RE15,979 | E | 1/1925 | Schaefer et al. |
| 1,794,684 | A | 3/1931 | Handel |
| 1,936,223 | A | 11/1933 | Awbrey |
| 2,058,148 | A | 10/1936 | Hard |
| 2,097,821 | A | 11/1937 | Mathers |
| 2,280,647 | A | 4/1942 | Hawes |
| 2,300,181 | A | 10/1942 | Spaight |
| 2,403,566 | A | 7/1946 | Thorp et al. |
| 2,413,772 | A | 1/1947 | Morehouse |
| 2,605,867 | A | 8/1952 | Goodwin |
| 2,780,936 | A | 2/1957 | Hillberg |
| 2,898,758 | A | 8/1959 | Henrickson |
| 2,929,238 | A | 3/1960 | Kaye |

(Continued)

FOREIGN PATENT DOCUMENTS

| | | |
|---|---|---|
| CH | 279209 | 3/1952 |
| EP | 0199595 B1 | 3/1995 |

(Continued)

OTHER PUBLICATIONS

ASTM Standard E754-80 (2006), Standard Test Method for Pullout Resistance of Ties and Anchors Embedded in Masonry Mortar Joints, ASTM International, 8 pages, West Conshohocken, Pennsylvania, United States.

(Continued)

*Primary Examiner* — Jessica Laux
(74) *Attorney, Agent, or Firm* — Silber & Fridman (57) ABSTRACT

An anchoring system for cavity walls is disclosed and includes a stud-type wall anchor and veneer tie. The stud-type anchor is comprised of high-strength, nonconductive thermally-isolating components that maintain the insulation R-values. The anchor has a driver head, dual-diameter barrel, a driven tip and multiple thermally-isolating seals. The multiple seals and the dual-diameter barrel of the anchor fill the anchor-receiving channel and stabilize the wall anchor. The wall anchor is clamped in place by the multiple seals. The anchor operates with various veneer ties.

20 Claims, 7 Drawing Sheets

(56) References Cited

U.S. PATENT DOCUMENTS

| | | | |
|---|---|---|---|
| 2,966,705 A | 1/1961 | Massey | |
| 1,170,419 A | 2/1961 | Coon | |
| 2,999,571 A | 9/1961 | Huber | |
| 3,030,670 A | 4/1962 | Bigelow | |
| 3,183,628 A | 5/1965 | Smith | |
| 3,254,736 A | 6/1966 | Gass | |
| 3,277,626 A | 10/1966 | Brynjolfsson et al. | |
| 3,300,939 A | 1/1967 | Brynjolfsson et al. | |
| 3,310,926 A | 3/1967 | Brandreth et al. | |
| 3,341,998 A | 9/1967 | Lucas | |
| 3,377,764 A | 4/1968 | Storch | |
| 3,478,480 A | 11/1969 | Swenson | |
| 3,563,131 A | 2/1971 | Ridley, Sr. | |
| 3,568,389 A | 3/1971 | Gulow | |
| 3,640,043 A | 2/1972 | Querfeld et al. | |
| 3,964,226 A | 6/1976 | Hala et al. | |
| 3,964,227 A | 6/1976 | Hala | |
| 4,021,990 A | 5/1977 | Schwalberg | |
| 4,227,359 A | 10/1980 | Schlenker | |
| 4,238,987 A | 12/1980 | Siebrecht-Reuter | |
| 4,305,239 A | 12/1981 | Geraghty | |
| 4,373,314 A | 2/1983 | Allan | |
| 4,382,416 A | 5/1983 | Kellogg-Smith | |
| 4,424,745 A | 1/1984 | Magorian et al. | |
| 4,438,611 A | 3/1984 | Bryant | |
| 4,473,984 A * | 10/1984 | Lopez | 52/410 |
| 4,482,368 A | 11/1984 | Roberts | |
| 4,571,909 A | 2/1986 | Berghuis et al. | |
| 4,596,102 A | 6/1986 | Catani et al. | |
| 4,598,518 A | 7/1986 | Hohmann | |
| 4,606,163 A | 8/1986 | Catani | |
| 4,622,796 A | 11/1986 | Aziz et al. | |
| 4,628,657 A | 12/1986 | Ermer et al. | |
| 4,636,125 A | 1/1987 | Burgard | |
| 4,640,848 A | 2/1987 | Cerdan-Diaz et al. | |
| 4,660,342 A | 4/1987 | Salisbury | |
| 4,703,604 A | 11/1987 | Muller | |
| 4,708,551 A | 11/1987 | Richter et al. | |
| 4,738,070 A | 4/1988 | Abbott et al. | |
| 4,764,069 A * | 8/1988 | Reinwall et al. | 411/397 |
| 4,819,401 A | 4/1989 | Whitney, Jr. | |
| 4,827,684 A | 5/1989 | Allan | |
| 4,843,776 A | 7/1989 | Guignard | |
| 4,852,320 A | 8/1989 | Ballantyne | |
| 4,869,038 A | 9/1989 | Catani | |
| 4,869,043 A | 9/1989 | Hatzinikolas et al. | |
| 4,875,319 A | 10/1989 | Hohmann | |
| 4,911,949 A | 3/1990 | Iwase et al. | |
| 4,922,680 A | 5/1990 | Kramer et al. | |
| 4,946,632 A | 8/1990 | Pollina | |
| 4,955,172 A | 9/1990 | Pierson | |
| 5,063,722 A | 11/1991 | Hohmann | |
| 5,099,628 A | 3/1992 | Noland et al. | |
| 5,207,043 A | 5/1993 | McGee et al. | |
| 5,307,602 A | 5/1994 | braut | |
| 5,392,581 A | 2/1995 | Hatzinikolas et al. | |
| 5,408,798 A | 4/1995 | Hohmann | |
| 5,440,854 A | 8/1995 | Hohmann | |
| 5,454,200 A | 10/1995 | Hohmann | |
| 5,456,052 A | 10/1995 | Anderson et al. | |
| 5,490,366 A | 2/1996 | Burns et al. | |
| 5,598,673 A | 2/1997 | Atkins | |
| 5,634,310 A | 6/1997 | Hohmann | |
| 5,669,592 A | 9/1997 | Kearful | |
| 5,671,578 A | 9/1997 | Hohmann | |
| 5,673,527 A | 10/1997 | Coston et al. | |
| 5,755,070 A | 5/1998 | Hohmann | |
| 5,816,008 A | 10/1998 | Hohmann | |
| 5,819,486 A | 10/1998 | Goodings | |
| 5,845,455 A | 12/1998 | Johnson, III | |
| 6,000,178 A | 12/1999 | Goodings | |
| 6,125,608 A | 10/2000 | Charlson | |
| 6,209,281 B1 | 4/2001 | Rice | |
| 6,279,283 B1 | 8/2001 | Hohmann et al. | |
| 6,284,311 B1 | 9/2001 | Gregorovich et al. | |
| 6,332,300 B1 | 12/2001 | Wakai | |
| 6,351,922 B1 | 3/2002 | Burns et al. | |
| 6,367,219 B1 | 4/2002 | Quinlan | |
| 6,612,343 B2 | 9/2003 | Camberlin et al. | |
| 6,627,128 B1 | 9/2003 | Boyer | |
| 6,668,505 B1 | 12/2003 | Hohmann et al. | |
| 6,686,301 B1 | 2/2004 | Li et al. | |
| 6,735,915 B1 | 5/2004 | Johnson, III | |
| 6,739,105 B2 | 5/2004 | Fleming | |
| 6,789,365 B1 | 9/2004 | Hohmann et al. | |
| 6,817,147 B1 | 11/2004 | MacDonald | |
| 6,827,969 B1 | 12/2004 | Skoog et al. | |
| 6,837,013 B2 | 1/2005 | Foderberg et al. | |
| 6,851,239 B1 | 2/2005 | Hohmann et al. | |
| 6,925,768 B2 | 8/2005 | Hohmann et al. | |
| 6,941,717 B2 | 9/2005 | Hohmann et al. | |
| 6,968,659 B2 | 11/2005 | Boyer | |
| 7,007,433 B2 | 3/2006 | Boyer | |
| 7,017,318 B1 | 3/2006 | Hohmann et al. | |
| 7,043,884 B2 | 5/2006 | Moreno | |
| 7,059,577 B1 | 6/2006 | Burgett | |
| D527,834 S | 9/2006 | Thimons et al. | |
| 7,147,419 B2 | 12/2006 | Balbo Di Vinadio | |
| 7,152,382 B2 | 12/2006 | Johnson, III | |
| 7,171,788 B2 | 2/2007 | Bronner | |
| 7,178,299 B2 | 2/2007 | Hyde et al. | |
| D538,948 S | 3/2007 | Thimons et al. | |
| 7,225,590 B1 | 6/2007 | diGirolamo et al. | |
| 7,325,366 B1 | 2/2008 | Hohmann, Jr. et al. | |
| 7,334,374 B2 | 2/2008 | Schmid | |
| 7,374,825 B2 | 5/2008 | Hazel et al. | |
| 7,415,803 B2 * | 8/2008 | Bronner | 52/378 |
| 7,469,511 B2 | 12/2008 | Wobber | |
| 7,481,032 B2 | 1/2009 | Tarr | |
| 7,552,566 B2 | 6/2009 | Hyde et al. | |
| 7,562,506 B2 | 7/2009 | Hohmann, Jr. | |
| 7,587,874 B2 | 9/2009 | Hohmann, Jr. | |
| 7,735,292 B2 | 6/2010 | Massie | |
| 7,748,181 B1 | 7/2010 | Guinn | |
| 7,788,869 B2 | 9/2010 | Voegele, Jr. | |
| D626,817 S | 11/2010 | Donowho et al. | |
| 7,845,137 B2 | 12/2010 | Hohmann, Jr. | |
| 8,037,653 B2 * | 10/2011 | Hohmann, Jr. | 52/379 |
| 8,051,619 B2 | 11/2011 | Hohmann, Jr. | |
| 8,096,090 B1 | 1/2012 | Hohmann, Jr. et al. | |
| 8,109,706 B2 | 2/2012 | Richards | |
| 8,122,663 B1 | 2/2012 | Hohmann, Jr. et al. | |
| 8,201,374 B2 | 6/2012 | Hohmann, Jr. | |
| 8,209,934 B2 | 7/2012 | Pettingale | |
| 8,215,083 B2 | 7/2012 | Toas et al. | |
| 8,291,672 B2 | 10/2012 | Hohmann, Jr. et al. | |
| 8,347,581 B2 | 1/2013 | Doerr et al. | |
| 8,375,667 B2 | 2/2013 | Hohmann, Jr. | |
| 8,418,422 B2 | 4/2013 | Johnson, III | |
| 8,511,041 B2 | 8/2013 | Fransen | |
| 8,516,763 B2 | 8/2013 | Hohmann, Jr. | |
| 8,516,768 B2 | 8/2013 | Johnson, III | |
| 8,544,228 B2 * | 10/2013 | Bronner | 52/378 |
| 8,555,587 B2 | 10/2013 | Hohmann, Jr. | |
| 8,555,596 B2 | 10/2013 | Hohmann, Jr. | |
| 8,596,010 B2 | 12/2013 | Hohmann, Jr. | |
| 8,613,175 B2 | 12/2013 | Hohmann, Jr. | |
| 8,667,757 B1 | 3/2014 | Hohmann, Jr. | |
| 2001/0054270 A1 | 12/2001 | Rice | |
| 2002/0100239 A1 | 8/2002 | Lopez | |
| 2003/0121226 A1 | 7/2003 | Bolduc | |
| 2003/0217521 A1 | 11/2003 | Richardson et al. | |
| 2004/0216408 A1 | 11/2004 | Hohmann, Jr. | |
| 2004/0216413 A1 | 11/2004 | Hohmann et al. | |
| 2004/0216416 A1 | 11/2004 | Hohmann et al. | |
| 2004/0231270 A1 | 11/2004 | Collins et al. | |
| 2005/0279042 A1 * | 12/2005 | Bronner | 52/513 |
| 2005/0279043 A1 * | 12/2005 | Bronner | 52/561 |
| 2006/0198717 A1 | 9/2006 | Fuest | |
| 2006/0242921 A1 | 11/2006 | Massie | |
| 2006/0251916 A1 | 11/2006 | Arikawa et al. | |
| 2008/0092472 A1 | 4/2008 | Doerr et al. | |
| 2008/0141605 A1 * | 6/2008 | Hohmann | 52/408 |
| 2008/0222992 A1 | 9/2008 | Hikai et al. | |

(56) References Cited

U.S. PATENT DOCUMENTS

| | | |
|---|---|---|
| 2009/0133351 A1 | 5/2009 | Wobber |
| 2009/0133357 A1 | 5/2009 | Richards |
| 2010/0037552 A1 | 2/2010 | Bronner |
| 2010/0071307 A1 | 3/2010 | Hohmann, Jr. |
| 2010/0101175 A1 | 4/2010 | Hohmann |
| 2010/0192495 A1 | 8/2010 | Huff et al. |
| 2010/0257803 A1 | 10/2010 | Hohmann, Jr. |
| 2011/0023748 A1 | 2/2011 | Wagh et al. |
| 2011/0041442 A1 | 2/2011 | Bui |
| 2011/0047919 A1* | 3/2011 | Hohmann, Jr. ............ 52/513 |
| 2011/0061333 A1 | 3/2011 | Bronner |
| 2011/0083389 A1 | 4/2011 | Bui |
| 2011/0146195 A1 | 6/2011 | Hohmann, Jr. |
| 2011/0173902 A1 | 7/2011 | Hohmann, Jr. et al. |
| 2011/0277397 A1 | 11/2011 | Hohmann, Jr. |
| 2012/0186183 A1 | 7/2012 | Johnson, III |
| 2012/0304576 A1 | 12/2012 | Hohmann, Jr. |
| 2012/0308330 A1 | 12/2012 | Hohmann, Jr. |
| 2013/0008121 A1 | 1/2013 | Dalen |
| 2013/0074435 A1 | 3/2013 | Hohmann, Jr. |
| 2013/0232893 A1 | 9/2013 | Hohmann, Jr. |
| 2013/0232909 A1 | 9/2013 | Curtis et al. |
| 2013/0247482 A1 | 9/2013 | Hohmann, Jr. |
| 2013/0247483 A1 | 9/2013 | Hohmann, Jr. |
| 2013/0247484 A1 | 9/2013 | Hohmann, Jr. |
| 2013/0247498 A1 | 9/2013 | Hohmann, Jr. |
| 2013/0340378 A1 | 12/2013 | Hohmann, Jr. |
| 2014/0000211 A1 | 1/2014 | Hohmann, Jr. |
| 2014/0075855 A1 | 3/2014 | Hohmann, Jr. |
| 2014/0075856 A1 | 3/2014 | Hohmann, Jr. |
| 2014/0075879 A1 | 3/2014 | Hohmann, Jr. |
| 2014/0096466 A1 | 4/2014 | Hohmann, Jr. |
| 2014/0174013 A1 | 6/2014 | Hohmann, Jr. et al. |

FOREIGN PATENT DOCUMENTS

| | | |
|---|---|---|
| GB | 1575501 | 9/1980 |
| GB | 2069024 A | 8/1981 |
| GB | 2246149 A | 1/1992 |
| GB | 2265164 A | 9/1993 |
| GB | 2459936 A | 3/2013 |

OTHER PUBLICATIONS

Building Envelope Requirements for Commercial and High Rise Residential Buildings, 780 CMR sec. 1304.0 et seq. of Chapter 13, Jan. 1, 2001, 19 pages, Boston, Massachusetts, United States.

Building Code Requirements for Masonry Structures, TMS 402-11/ACI 530-11/ASCE 5-11, Chapter 6, 12 pages.

Hohmann & Barnard, Inc.; Product Catalog, 2009, 52 pages, Hauppauge, New York, United States.

Astm Standard Specification A951/A951M—11, Table 1, Standard Specification for Steel Wire for Masonry Joint Reinforcement, Nov. 14, 2011, 6 pages, West Conshohocken, Pennsylvania, United States.

State Board of Building Regulations and Standards, Building Envelope Requirements, 780 CMR sec. 1304.0 et seq., 7th Edition, Aug. 22, 2008, 11 pages, Boston, MA, United States.

Hohmann & Barnard, Product Catalog, 44 pgs (2003).

Kossecka, Ph.D, et al., Effect of Insulation and Mass Distribution in Exterior Walls on Dynamic Thermal Performance of Whole Buildings, Thermal Envelopes VII/Building Systems—Principles p. 721-731, 1998, 11 pages.

* cited by examiner

THERMALLY ISOLATED ANCHORING SYSTEM

BACKGROUND OF THE INVENTION

1. Field of the Invention

This invention relates to thermally isolated, multiple sealing anchoring systems for insulated cavity walls. The anchoring system incorporates high-strength insulative polymeric components. The polymeric components minimize thermal transfer between the inner wythe and the anchoring system, by providing a thermal break.

2. Description of the Prior Art

In the past, anchoring systems have taken a variety of configurations. Where the applications included masonry backup walls, wall anchors were commonly incorporated into ladder- or truss-type reinforcements and provided wire-to-wire connections with box ties or pintle-receiving designs on the veneer side.

In the late 1980's, surface-mounted wall anchors were developed by Hohmann & Barnard, Inc., now a MiTek-Berkshire Hathaway company, patented under U.S. Pat. No. 4,598,518 ('518). The invention was commercialized under trademarks DW-10®, DW-10-X®, and DW-10-HS®. These widely accepted building specialty products were designed primarily for drywall construction, but were also used with masonry backup walls. For seismic applications, it was common practice to use these wall anchors as part of the DW-10 Seismiclip® interlock system which added a Byna-Tie® wire formative, a Seismiclip® snap-in device—described in U.S. Pat. No. 4,875,319 ('319), and a continuous wire reinforcement.

In the dry wall application, the surface-mounted wall anchor of the above-described system has pronged legs that pierce the insulation and the wallboard and rest against the metal stud to provide mechanical stability in a four-point landing arrangement. The vertical slot of the wall anchor enables the mason to have the wire tie adjustably positioned along a pathway of up to 3.625-inch (max). The interlock system served well and received high scores in testing and engineering evaluations which examined the effects of various forces, particularly lateral forces, upon brick veneer masonry construction. However, under certain conditions, the system did not sufficiently maintain the integrity of the insulation.

The engineering evaluations further described the advantages of having a continuous wire embedded in the mortar joint of anchored veneer wythes. The seismic aspects of these investigations were reported in the inventor's '319 patent. Besides earthquake protection, the failure of several high-rise buildings to withstand wind and other lateral forces resulted in the incorporation of a continuous wire reinforcement requirement in the Uniform Building Code provisions. The use of a continuous wire in masonry veneer walls has also been found to provide protection against problems arising from thermal expansion and contraction and to improve the uniformity of the distribution of lateral forces in the structure.

Shortly after the introduction of the pronged wall anchor, a seismic veneer anchor, which incorporated an L-shaped backplate, was introduced. This was formed from either 12- or 14-gauge sheetmetal and provided horizontally disposed openings in the arms thereof for pintle legs of the veneer anchor. In general, the pintle-receiving sheetmetal version of the Seismiclip® interlock system served well, but in addition to the insulation integrity problem, installations were hampered by mortar buildup interfering with pintle leg insertion.

In the late 1980's, an anchor for masonry veneer walls was developed and described in U.S. Pat. No. 4,764,069 by Reinwall et al., which patent is an improvement of the masonry veneer anchor of Lopez, U.S. Pat. No. 4,473,984. Here the anchors are keyed to elements that are installed using power-rotated drivers to deposit a mounting stud in a cementitious or masonry backup wall. Fittings are then attached to the stud which includes an elongated eye and a wire tie therethrough for disposition in a bed joint of the outer wythe. It is instructive to note that pin-point loading—that is forces concentrated at substantially a single point—developed from this design configuration. Upon experiencing lateral forces over time, this resulted in the loosening of the stud.

Exemplary of the public sector building specification is that of the Energy Code Requirement, Boston, Mass. (See Chapter 13 of 780 CMR, Seventh Edition). This Code sets forth insulation R—values well in excess of prior editions and evokes an engineering response opting for thicker insulation and correspondingly larger cavities. As insulation became thicker, the tearing of insulation during installation of the pronged DW-10X® wall anchor, see supra, became more prevalent. This occurred as the installer would fully insert one side of the wall anchor before seating the other side. The tearing would occur during the arcuate path of the insertion of the second leg. The gapping caused in the insulation permitted air and moisture to infiltrate through the insulation along the pathway formed by the tear. While the gapping was largely resolved by placing a self-sealing, dual-barrier polymeric membrane at the site of the legs and the mounting hardware, with increasing thickness in insulation, this patchwork became less desirable. The improvements hereinbelow in surface mounted wall anchors look toward greater retention of insulation integrity and less reliance on a patch.

In the past, the use of wire formatives have been limited by the mortar layer thickness which, in turn, are dictated either by the new building specifications or by pre-existing conditions, e.g. matching during renovations or additions to the existing mortar layer thickness. While arguments have been made for increasing the number of the fine-wire anchors per unit area of the facing layer, architects and architectural engineers have favored wire formative anchors of sturdier wire.

Contractors found that heavy wire anchors, with diameters approaching the mortar layer height specification, frequently result in misalignment. This led to the low-profile wall anchors of the inventors hereof as described in U.S. Pat. No. 6,279,283. However, the above-described technology did not fully address the adaption thereof to insulated inner wythes utilizing stabilized stud-type devices.

Another prior art development occurred shortly after that of Reinwall/Lopez when Hatzinikolas and Pacholok of Fero Holding Ltd. introduced their sheetmetal masonry connector for a cavity wall. This device is described in U.S. Pat. Nos. 5,392,581 and 4,869,043. Here a sheetmetal plate connects to the side of a dry wall column and protrudes through the insulation into the cavity. A wire tie is threaded through a slot in the leading edge of the plate capturing an insulative plate thereunder and extending into a bed joint of the veneer. The underlying sheetmetal plate is highly thermally conductive, and the '581 patent describes lowering the thermal conductivity by foraminously structuring the plate. However, as there is no thermal break or barrier, a concomitant loss of the insulative integrity results.

The construction of a steel-framed inner wythe of a commercial building, to which masonry veneer is attached, uses steel studs with insulation installed outboard of the steel stud framing. Steel anchors and ties attach the outer wythe to the inner wythe by screwing or bolting an anchor to a steel stud.

Although steel offers many benefits, it does not provide the high insulation efficiency of timber framing and can cause the effective R-value of fiberglass batt insulation between the steel studs to fall 50 to 60%.

Steel is an extremely good conductor of heat. The use of steel anchors attached to steel framing draws heat from the inside of a building through the exterior sheathing and insulation, towards the exterior of the masonry wall. In order to maintain high insulation values, a thermal break or barrier is needed between the steel framing and the outer wythe. This is achieved by the present invention through the use of high-strength polymeric components which have low thermal conductivity.

In the course of prosecution, wall anchor patents indicated by an asterisk on the tabulation below, came to the attention of the inventor and are believed to be relevant in this discussion of the prior art. A more extensive list of patents known to the inventor is included in the Information Disclosure Statement. Thereafter and in preparing for this disclosure, the additional patents which became known to the inventors are discussed further:

| Pat. | Inventor | Issue Date |
| --- | --- | --- |
| 2,058,148* | Hard | Oct. 20, 1936 |
| 2,966,705* | Massey | Jan. 3, 1961 |
| 3,377,764 | Storch | Apr. 16, 1968 |
| 4,021,990* | Schwalberg | May 10, 1977 |
| 4,305,239* | Geraghty | Dec. 15, 1981 |
| 4,373,314 | Allan | Feb. 15, 1983 |
| 4,438,611* | Bryan | Mar. 27, 1984 |
| 4,473,984 | Lopez | Oct. 2, 1984 |
| 4,598,518 | Hohmann | Jul. 8, 1986 |
| 4,869,038 | Cantani | Sep. 26, 1989 |
| 4,875,319 | Hohmann | Oct. 24, 1989 |
| 5,392,581 | Hatzinikolas, et. al. | Feb. 28, 1995 |
| 5,408,798 | Hohmann | Apr. 25, 1995 |
| 5,456,052 | Anderson et al. | Oct. 10, 1995 |
| 5,816,008 | Hohmann | Oct. 6, 1998 |
| 6,209,281 | Rice | Apr. 3, 2001 |
| 6,279,283 | Hohmann et al. | Aug. 28, 2001 |
| 7,415,803 | Bronner | Aug. 26, 2008 |
| 8,037,653 | Hohmann, Jr. | Oct. 18, 2011 |

U.S. Pat. No. 3,377,764—D. Storch—Issued Apr. 16, 1968 discloses a bent wire, tie-type anchor for embedment in a facing exterior wythe engaging with a loop attached to a straight wire run in a backup interior wythe.

U.S. Pat. No. 4,021,990—Schwalberg—Issued May 10, 1977 discloses a dry wall construction system for anchoring a facing veneer to wallboard/metal stud construction with a pronged sheetmetal anchor. Like Storch '764, the wall tie is embedded in the exterior wythe and is not attached to a straight wire run.

U.S. Pat. No. 4,373,314—Allan—Issued Feb. 15, 1983 discloses a vertical angle iron with one leg adapted for attachment to a stud and the other having elongated slots to accommodate wall ties. Insulation is applied between projecting vertical legs of adjacent angle irons with slots being spaced away from the stud to avoid the insulation.

U.S. Pat. No. 4,473,984—Lopez—Issued Oct. 2, 1984 discloses a curtain-wall masonry anchor system wherein a wall tie is attached to the inner wythe by a self-tapping screw to a metal stud and to the outer wythe by embedment in a corresponding bed joint. The stud is applied through a hole cut into the insulation.

U.S. Pat. No. 4,869,038—Cantani—Issued Sep. 26, 1989 discloses a veneer wall anchor system having in the interior wythe a truss-type anchor, similar to Hala et al. '226, supra, but with horizontal sheetmetal extensions. The extensions are interlocked with bent wire pintle-type wall ties that are embedded within the exterior wythe.

U.S. Pat. No. 4,875,319—Hohmann—Issued Oct. 24, 1989 discloses a seismic construction system for anchoring a facing veneer to wallboard/metal stud construction with a pronged sheetmetal anchor. Wall tie is distinguished over that of Schwalberg '990 and is clipped onto a straight wire run.

U.S. Pat. No. 5,392,581—Hatzinikolas et al.—Issued Feb. 28, 1995 discloses a cavity-wall anchor having a conventional tie wire for mounting in the brick veneer and an L-shaped sheetmetal bracket for mounting vertically between side-by-side blocks and horizontally atop a course of blocks. The bracket has a slit which is vertically disposed and protrudes into the cavity. The slit provides for a vertically adjustable anchor.

U.S. Pat. No. 5,408,798—Hohmann—Issued Apr. 25, 1995 discloses a seismic construction system for a cavity wall having a masonry anchor, a wall tie, and a facing anchor. Sealed eye wires extend into the cavity and wire wall ties are threaded therethrough with the open ends thereof embedded with a Hohmann '319 (see supra) clip in the mortar layer of the brick veneer.

U.S. Pat. No. 5,456,052—Anderson et al.—Issued Oct. 10, 1995 discloses a two-part masonry brick tie, the first part being designed to be installed in the inner wythe and then, later when the brick veneer is erected to be interconnected by the second part. Both parts are constructed from sheetmetal and are arranged on substantially the same horizontal plane.

U.S. Pat. No. 5,816,008—Hohmann—Issued Oct. 6, 1998 discloses a brick veneer anchor primarily for use with a cavity wall with a drywall inner wythe. The device combines an L-shaped plate for mounting on the metal stud of the drywall and extending into the cavity with a T-head bent stay. After interengagement with the L-shaped plate the free end of the bent stay is embedded in the corresponding bed joint of the veneer.

U.S. Pat. No. 6,209,281—Rice—Issued Apr. 3, 2001 discloses a masonry anchor having a conventional tie wire for mounting in the brick veneer and sheetmetal bracket for mounting on the metal-stud-supported drywall. The bracket has a slit which is vertically disposed when the bracket is mounted on the metal stud and, in application, protrudes through the drywall into the cavity. The slit provides for a vertically adjustable anchor.

U.S. Pat. No. 6,279,283—Hohmann et al.—Issued Aug. 28, 2001 discloses a low-profile wall tie primarily for use in renovation construction where in order to match existing mortar height in the facing wythe a compressed wall tie is embedded in the bed joint of the brick veneer.

U.S. Pat. No. 7,415,803—Bronner—Issued Aug. 26, 2008 discloses a double-wingnut anchor system and method for connecting an anchor shaft extending from the backup wall to a wire tie extending from a veneer wall. The wingnut houses the wire tie legs and is independently rotatable to obtain the desired angular position.

U.S. Pat. No. 8,037,653—Hohmann, Jr.—Issued Oct. 18, 2011 discloses a dual seal anchoring system for insulated cavity walls. The stud anchor has a dual-diameter barrel with thermally-isolating seals.

The present invention provides an advancement in anchoring systems. The use of polymeric seals at key locations in the anchor provide thermal breaks between the highly conductive steel framing studs and the outer wythe. Further, the multiple seal structure prevents moisture from infiltrating the insulation and cavity and provides an adjustable method of veneer tie attachment.

None of the above references provide the thermally insulated, multiple seal stud-type wall anchor or anchoring systems utilizing the innovations of this invention. As will become clear in reviewing the disclosure which follows, the insulated cavity wall structures benefit from the recent developments described herein that lead to solving the problems of thermal isolation, of insulation and air/vapor barrier integrity, of high-span applications, and of pin-point loading. The wall anchors, when combined with various veneer tie arrangements hereof, provide for angular adjustment therebetween, self-leveling installation, and seismic level of protection.

SUMMARY

In general terms, one embodiment of the invention disclosed hereby is an anchoring system for use in an insulated cavity wall. The anchoring system has a thermally isolating stud-type wall anchor and a wire formative veneer tie. The wall anchor has an elongated dual-diameter barrel body with a driven self-drilling tip and consists of high-strength compressible seals that provide a thermal break between the inner wythe and the outer wythe.

At the juncture of the smaller diameter barrel and the larger diameter barrel, there is a flange that houses a vapor seal. At the juncture of the larger diameter barrel and the driver head, there is a flange that houses an insulation seal. At the juncture of the threaded portion and the smaller diameter barrel, there is a flange that houses an insertion seal. The wall anchor is dimensioned with the length of the smaller diameter barrel (less the height of the vapor seal) to be coextensive with the drywall and the air/vapor barrier. Additionally, the wall anchor is dimensioned with the length of the larger diameter barrel (plus the height of the vapor seal) to be coextensive with the insulation.

The structure taught by this invention overcomes both the problems of pin-point loading and of insulation integrity described in the Background of the Invention hereinabove. The pin-point loading is overcome by full body support throughout the drywall, the air/vapor barrier, and the insulation. The vapor seal, when the stud-type anchor is fully driven into place provides a seal over the insertion point into the air/vapor barrier. The insulation seal, when the stud-type anchor is fully driven into place, provides a seal over the opening of the anchor-receiving channel and thereby preserves the insulation integrity. Similarly, the insertion seal, when the anchor is fully driven into place, provides a seal at the insertion point in the inner wythe. The polymeric seals provide a thermal break between the inner and outer wythe and thereby maintain insulation R-values. The vapor seal and the larger barrel of the anchor, when installed, completely fill the anchor receiving channel and stabilize the wall anchor. The wall anchor is clamped in place by the seals. The anchor includes either two or three seals. The wall anchor is designed to work with a combination of the insertion seal and the vapor seal, the insertion seal and the insulation seal or a combination of all three.

The stud-type anchor is disclosed as operating with a variety of veneer ties and drivers, each providing for different applications. A modified Byna-Tie® wire formative with a swaged side leg in the insertion portion expands the utility of the system to seismic applications and accommodates a wire reinforcement in the outer wythe. a tie with a U-shaped rear leg provides for accommodating the driver head at whatever angle it is at when fully driven into place. A tie with an angled rear leg provides for self-leveling as between the stud position and the bed joint height. A wingnut driver accommodates a tie with pintle side legs and provides for angular adjustment.

Objects and Features of the Invention

It is an object of the present invention to provide new and novel anchoring systems for insulated cavity walls, which systems provide high-strength thermally isolating components with multiple seals.

It is another object of the present invention to prevent air infiltration and water penetration into and along the wall anchoring-receiving channel.

It is yet another object of the present invention to provide adjustability of the veneer anchor to compensate for slight angular and height misalignments.

It is a further object of the present invention to provide an anchoring system which fully supports the wall anchor along the length thereof, precludes pin-point loading and prevents disengagement under seismic and other severe environmental conditions.

It is another object of the present invention to provide an anchoring system that maintains high insulation values.

It is a feature of the present invention that the wall anchor has a dual-diameter barrel with a self-drilling screw tip which facilitates installation.

It is another feature of the present invention that the wall anchor has high-strength compressible polymeric components that provide for a thermal break in the anchoring system.

It is yet another feature of the present invention that the anchoring system has a wingnut extension that is angularly adjustable.

It is still yet another feature of the present invention that the anchoring system is self-leveling with an infinity shaped veneer anchor.

Other objects and features of the present invention will become apparent upon reviewing the drawing and reading the detailed description which follows.

BRIEF DESCRIPTION OF THE DRAWINGS

In the following drawings, the same parts in the various views are afforded the same reference designators.

DETAILED DESCRIPTION

Before entering into the Detailed Description, several terms which will be revisited later are defined. These terms are relevant to discussions of innovations introduced by the improvements of this disclosure that overcome the deficits of the prior art devices.

In the embodiments described hereinbelow, the inner wythe is provided with insulation. In both the dry wall construction (shown herein) and in the masonry block backup wall construction the insulation is applied to the outer surface thereof. Recently, building codes have required that after the anchoring system is installed and, prior to the inner wythe being closed up, that an inspection be made for insulation integrity to ensure that the insulation prevents infiltration of air and moisture. The term as used herein is defined in the same sense as the building code in that, "insulation integrity" means that, after the installation of the anchoring system, there is no change or interference with the insulative properties and concomitantly that there is substantially no change in the air and moisture infiltration characteristics.

Anchoring systems for cavity walls are used to secure veneer facings to a buildings and overcome seismic and other forces, i.e. wind shear, etc. In the past, some systems have experienced failure because the forces have been concentrated at substantially a single point. Here, the term "pin-point loading" is defined as an anchoring system wherein forces are concentrated at a single point. In the Description which follows, means for supporting the wall anchor shaft to limit lateral movement are taught.

In addition to that which occurs at the facing wythe, attention is further drawn to the construction at the exterior surface of the inner or backup wythe. Here there are two concerns, namely (1) maximizing the strength and ease of the securement of the wall anchor to the backup wall; and, (2) as previously discussed, maintaining the integrity of the insulation. The first concern is addressed using appropriate fasteners such as self-drilling screws for mounting to metal, drywall studs. The latter concern is addressed in a two-fold manner, first by employing a channel seal which surrounds the opening formed for the installation of the wall anchor (profile is seen in the cross-sectional drawing FIG. 2) and secondly by using strategically placed thermally isolating seals set within the anchoring system. In the prior art, the metal anchors formed conductive bridges across the wall cavity to the metal studs of the inner wythe. Thus, where there is no thermal break, a concomitant loss of the insulative integrity results. The thermal conductivity of components is used to evaluate this phenomenon and the term is defined as the heat transfer resulting from metal-to-metal contacts across the inner wythe.

In the detailed description, the veneer ties and reinforcements are wire formatives. The wall anchor contains thermally isolating seals composed of high-strength polymeric material.

Figure 1:
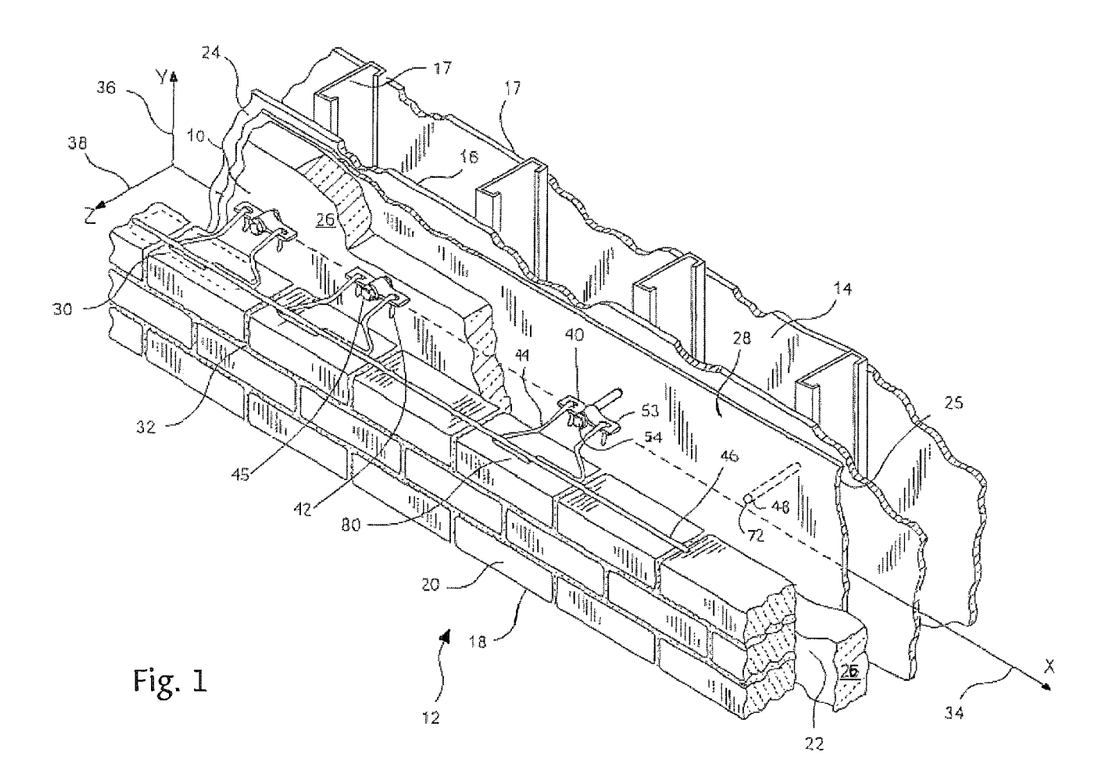
FIG. 1 shows a first embodiment of this invention and is a perspective view of an anchoring system as applied to a cavity wall with an inner wythe of an insulated dry wall construction and an outer wythe of brick.
Figure 2:
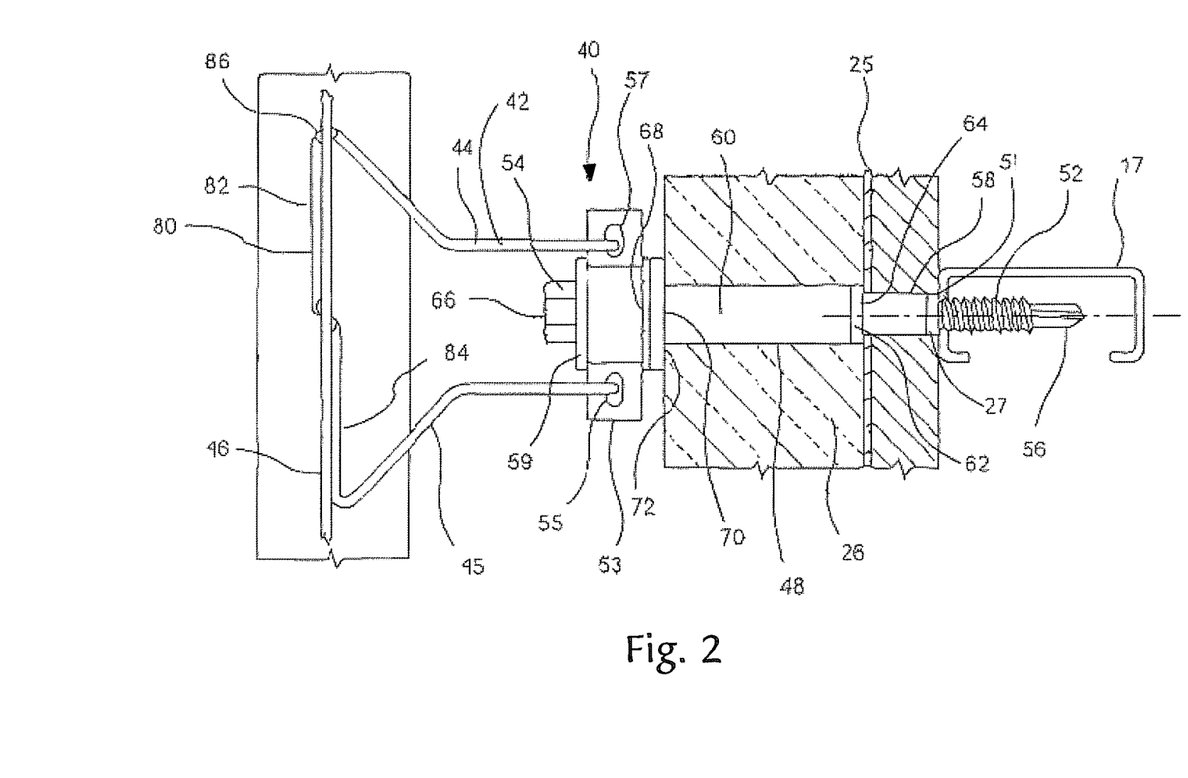
FIG. 2 is a cross-sectional view of FIG. 1 taken along an xz-plane including the longitudinal axis of the wall anchor, and showing three insulating seals.
Figure 3:
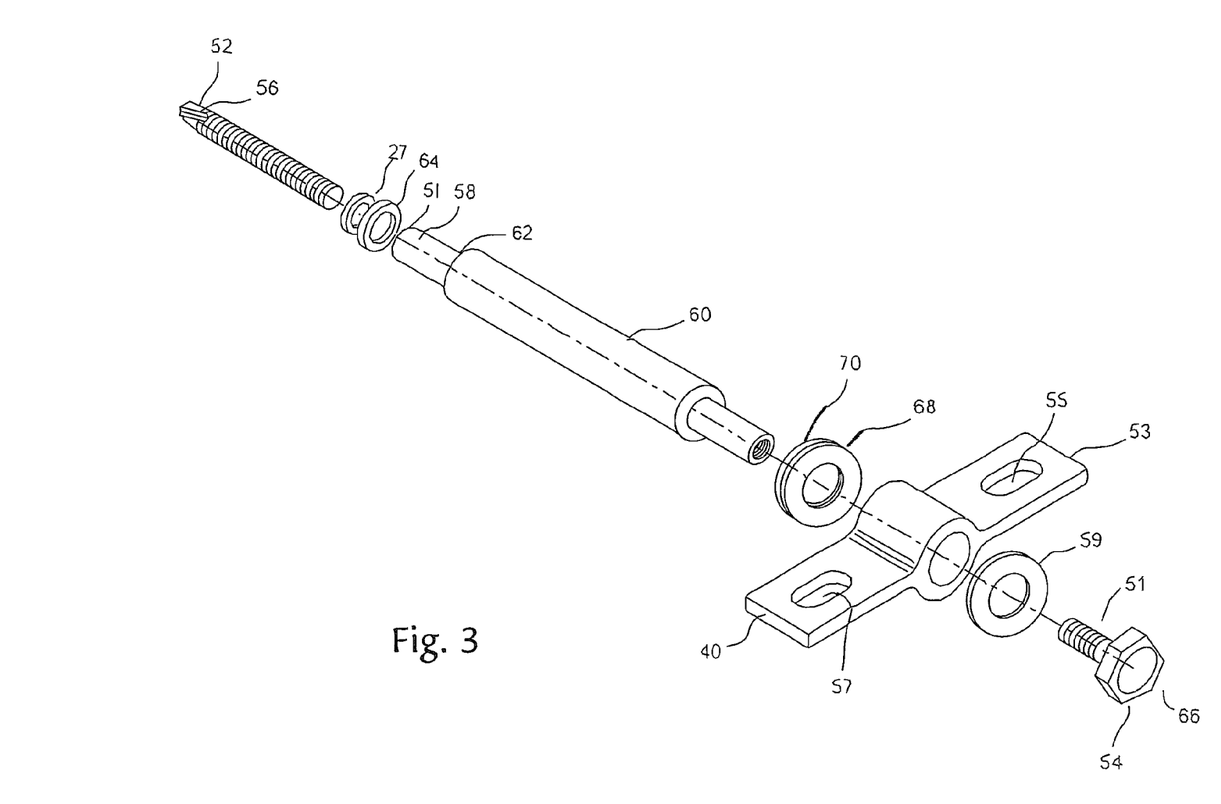
FIG. 3 is a perspective view of the wall anchor in an unassembled manner showing the dual-barrel configuration, the insulation seal, the vapor seal, the insertion seal and the self-drilling screw.

Referring now to FIGS. 1 through 3, the first embodiment shows an anchoring system suitable for seismic zone applications. This anchoring system, discussed in detail hereinbelow, has a wall anchor, an interengaging veneer tie, and a veneer (outer wythe) reinforcement. For the first embodiment, a cavity wall having an insulative layer of 4.0 inches (approx.) and a total span of 4.75 inches (approx.) is chosen as exemplary.

The anchoring system for cavity walls is referred to generally by the numeral 10. A cavity wall structure 12 is shown having an inner wythe or drywall backup 14 with sheetrock or wallboard 16 mounted on metal studs or columns 17 and an outer wythe or facing 18 of brick 20 construction. Inner wythes constructed of masonry materials or wood framing (not shown) are also applicable. Between the inner wythe 14 and the outer wythe 18, a cavity 22 is formed. The cavity 22 has attached to the exterior surface 24 of the inner wythe 14 an air/vapor barrier 25 and insulation 26. The insulation 26 shown is rigid insulation but other forms are applicable as well. The air/vapor barrier 25 and the wallboard 16 together form the exterior layer 28 of the inner wythe 14, which exterior layer 28 has the insulation 26 disposed thereon.

Successive bed joints 30 and 32 are substantially planar and horizontally disposed and, in accord with current building standards, are 0.375-inch (approx.) in height. Selective ones of bed joints 30 and 32, which are formed between courses of bricks 20, are constructed to receive therewithin the insertion portion of the veneer anchor. Being threadedly mounted in the inner wythe 14, the wall anchor 40 is supported thereby and, as described in greater detail herein below, is configured to minimize air and moisture penetration around the wall anchor/inner wythe interface.

For purposes of discussion, the cavity surface 24 of the inner wythe 14 contains a horizontal line or x-axis 34 and intersecting vertical line or y-axis 36. A horizontal line or z-axis 38, normal to the xy-plane, passes through the coordinate origin formed by the intersecting x- and y-axes. A wall anchor 40, while shown as a unitary structure, may be manufactured as an assemblage of several distinct parts.

The veneer tie 44 is a box Byna-Tie® device manufactured by Hohmann & Barnard, Inc., Hauppauge, N.Y. 11788. The veneer tie 44 is a wire formative with pintle connectors that engage the apertures 55 and 57 in the wingnut 53 of the anchor 40. The veneer tie 44 is shown in FIG. 1 as being emplaced on a course of bricks 20 in preparation for embedment in the mortar of bed joint 30. In this embodiment, the system includes a wire or outer wythe reinforcement 46, a wall anchor 40 and a veneer tie 44. The wire reinforcement 46 is constructed of a wire formative.

At intervals along a horizontal surface 24, wall anchors 40 are driven into place in the anchor-receiving channels 48. The wall anchors 40 are positioned on surface 24 so that the longitudinal axis of wall anchor 40 is normal to an xy-plane and taps into column 17. As best shown in FIGS. 2 and 3, the wall anchor 40 extends from a driven end 52 to a driver end or driving end 54. The driven end 52 is constructed with a self-drilling screw portion or threaded portion 56.

Contiguous with screw portion 56 is a dual-diameter barrel with a smaller diameter barrel or first shaft portion 58, with a substantially larger diameter than the threaded portion 56, toward the driven end 52 and a larger diameter barrel or second shaft portion 60 toward the driver end 54. At the juncture of the threaded portion 56 and the first shaft portion 58, an insertion flange 51 is formed, and a stabilizing neoprene fitting or insertion seal 27 is emplaced thereat. At the juncture of barrel portions 58 and 60, a vapor seal flange 62 is formed and a stabilizing neoprene fitting or vapor seal 64 is emplaced thereat. When fully driven into column 17 the screw 56 and barrel portion 58 of wall anchor 40 pierces the sheetrock or wallboard 16 and air/vapor barrier 25. The vapor seal 64 is configured to seal the anchor-receiving channel 48 at the insertion point of the wall anchor 40 through the barrier 25. The insulation seal 70 covers the insertion point or insulation flange 68, formed at the junction of the driver portion 66 and the second shaft portion 60, precluding air and moisture penetration therethrough and maintaining the integrity of barrier 25 by sealing the opening of the anchor-receiving channel 48.

At the driving end 54, a driver portion 66 adjoins larger diameter barrel or shaft portion 60 forming an insulation flange 68 therebetween and another stabilizing neoprene fitting or insulation seal 70 is emplaced thereat. Upon installation into rigid insulation, the larger barrel portion 60 is forced into a press fit relationship with anchor-receiving channel 48. Stabilization of this stud-type wall anchor 40 is attained by barrel portion 60 and vapor seal 60 completely filling the channel 48 with the insulation seal 70 capping the opening 72 of channel 48 into cavity 22 and clamping wall anchor 40 in place. This arrangement does not leave any end play or wiggle room for pin-point loading of the wall anchor and therefore does not loosen over time. With stabilizing fitting or insulation seal 70 in place, the insulation integrity within the cavity wall is maintained. The driver portion 66 is capable of being driven using a conventional chuck and, after being rotated to align with the bed joint 30, the wingnut 53 is locked in place. The wingnut 53 has two apertures 55 and 57 for accommodating the veneer tie and has the effect of spreading stresses experienced during use and further reducing pin-point loading as opposite force vectors cancel one another.

In producing wall anchor 48, the length of the smaller diameter barrel 58 less the vapor seal 64 is dimensioned to match the external layer 28 thickness. Similarly, the length of the larger diameter barrel 60 plus the internal or vapor seal 64 height is dimensioned to match the insulation thickness. The threaded portion 56, the first shaft portion 58, the second shaft portion 60 and the driver portion 66 are constructed of material selected from a group consisting of galvanized steel, hot dip galvanized steel, stainless steel, and bright basic steel.

In this embodiment, the driver portion 66 is a bolt 51 and washer 59 that secures a wingnut 53. The two apertured ends 55 and 57 of the wingnut 53 receive the veneer tie 44. The wingnut 53 is angularly adjusted to ensure proper alignment of the veneer tie 44. The veneer tie 44 is a wire formative having two pintle leg portions 42 and 45. The leg portions 42 and 45 are inserted into the apertured ends 55 and 57 of the wingnut 53 and extend to and, at the front portion thereof, are part of insertion portion 80 which is shown installed into bed joint 30. The insertion portion 80 is constructed with two parallel front legs 82 and 84 adjoining leg portions 42 and 45, respectively, and housing therebetween wire reinforcement 46. At the juncture of side leg 42 and front leg 82, a swaged area 86 is shown for further accommodating wire reinforcement 46.

FIG. 3 displays an exploded view that exhibits the components comprising the anchor of this embodiment. To provide a thermal break, when the inner wythe 16 is constructed from steel studs or columns 17, between the inner wythe 16 and the outer wythe 18, the insertion seal 27, the insulation seal 70 and the vapor seal 64 are constructed from a high-strength, thermally-insulating polymeric material such as PVC, neoprene, or an equivalent. The present system includes either the insulation seal 70 and the insertion seal 27, the vapor seal 64 and the insertion seal 27, or the insulation seal 70, the insertion seal 27 and the vapor seal 64.

Figure 4:
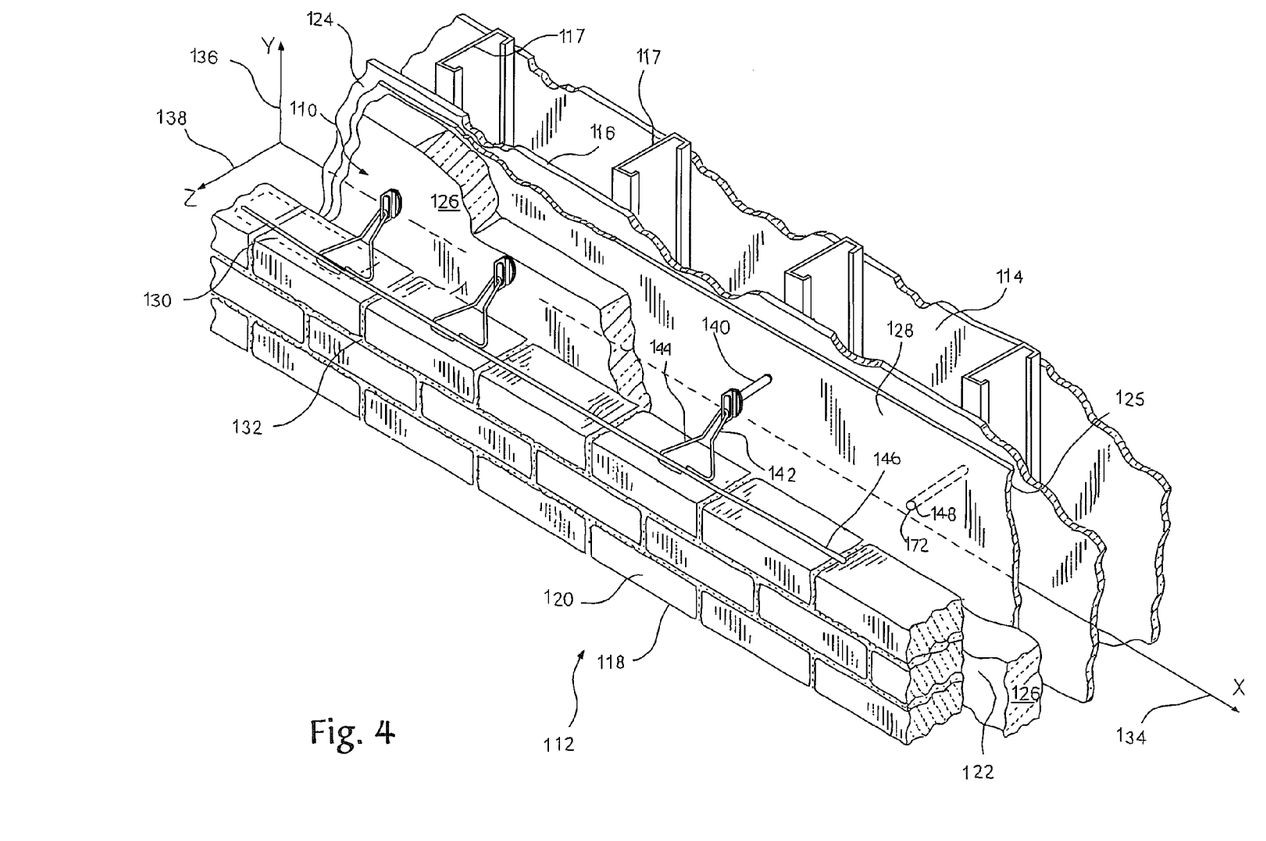
FIG. 4 is a second embodiment of this invention and is a perspective view of an anchoring system similar to FIG. 1, but showing an anchor component with a single elongated aperture that houses the veneer tie, and an insertion and vapor seal.
Figures 5, 6:
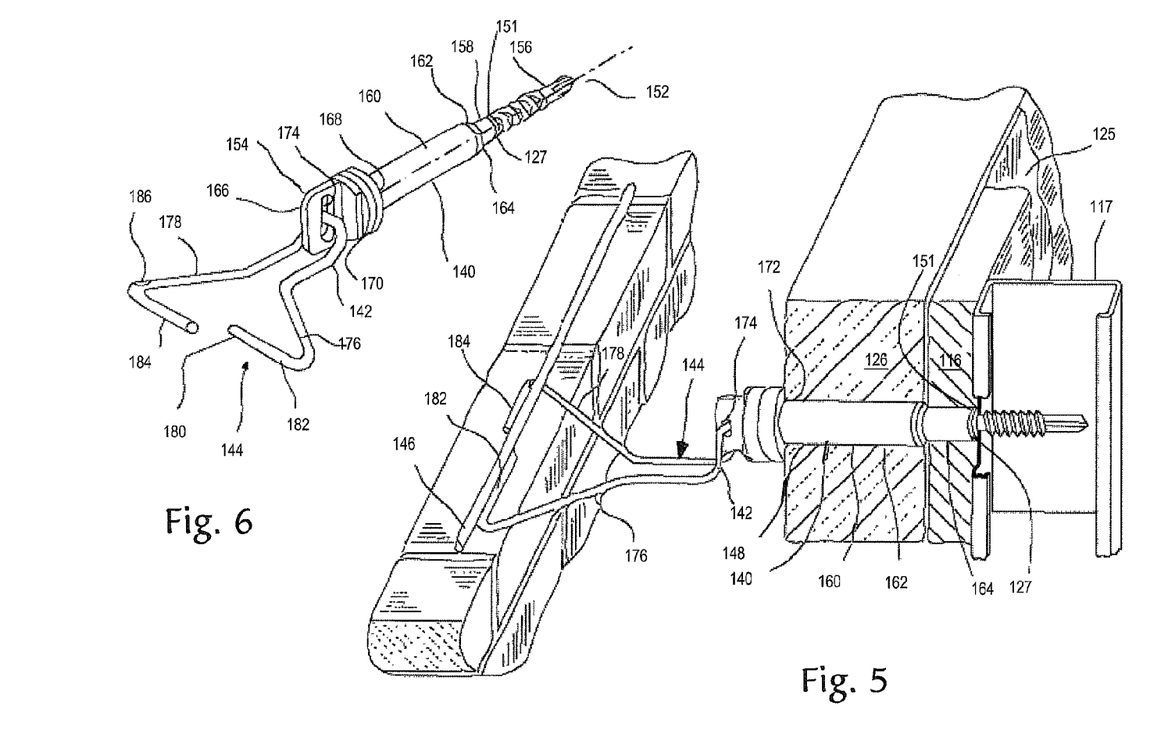
FIG. 5 is a partial perspective view of FIG. 4 which shows the multiple sealing of the wall anchor, a wire reinforcement for seismic protection, and the angular adjustability of the veneer anchor.
FIG. 6 is a perspective view of the wall anchor of FIG. 4 showing the dual-barrel configuration, the insertion seal, the vapor seal, and the self-drilling screw.

The description which follows is a second embodiment of the anchoring system for insulated cavity walls of this invention. For ease of comprehension, wherever possible similar parts use reference designators 100 units higher than those above. Thus, the veneer tie 144 of the second embodiment is analogous to the veneer tie 44 of the first embodiment. Referring now to FIGS. 4, 5 and 6, the second embodiment of the anchoring system is shown and is referred to generally by the numeral 110. As in the first embodiment, a wall structure 112 is shown. The second embodiment has an inner wythe or drywall back 114 with sheetrock or wallboard 116 mounted on metal studs or columns 117 and an outer wythe or facing wall 118 of brick 120 construction. Inner wythes constructed of masonry materials or wood framing (not shown) are also applicable. The cavity 122 has attached to the exterior surface 124 of the inner wythe 114 an air/vapor barrier 125 and insulation 126. The air/vapor barrier 125 and the wallboard 116 together form the exterior layer 128 of the inner wythe 114, which exterior layer 128 has the insulation 126 disposed thereon.

Successive bed joints 130 and 132 are substantially planar and horizontally disposed and, in accord with current building standards, are 0.375-inch (approx.) in height. Selective ones of bed joints 130 and 132, which are formed between courses of bricks 120, are constructed to receive therewithin the insertion portion of the veneer anchor hereof. Being threadedly mounted in the inner wythe, the wall anchor is supported thereby and, as described in greater detail herein below, is configured to minimize air and moisture penetration around the wall anchor/inner wythe interface.

For purposes of discussion, the cavity surface 124 of the inner wythe 114 contains a horizontal line or x-axis 134 and an intersecting vertical line or y-axis 136. A horizontal line of z-axis 138, normal to the xy-plane, passes through the coordinate origin formed by the intersecting x- and y-plane, passes through the coordinate origin formed by the intersecting x- and y-axes. A wall anchor construct 140 is shown, which penetrates the wallboard 116. The wall anchor 140 is a unitary construct which is constructed for mounting in inner wythe 114 and for interconnection with veneer tie 144.

The veneer tie 144 is adapted from one shown and described in Hohmann, U.S. Pat. No. 4,875,319, which patent is incorporated herein by reference. The veneer tie 144 is shown in FIG. 4 as being emplaced on a course of bricks 120 in preparation for embedment in the mortar bed joint 130. In this embodiment, the system includes a wall anchor 140 and a veneer tie 144.

But for the structure of the driver portion 166, the wall anchor 140 is like wall anchor 40 just described. Here, the driver portion 166 has an elongated aperture 174 for the interlacing of the veneer tie 144. The veneer tie 144 is a wire formative having a U-shaped rear leg portion 142 for angular adjustment. From the rear leg 142, two side legs 176 and 178 extend to and, at the front portion thereof, are part of insertion portion 180 which is shown installed into bed joint 130. The insertion portion 180 is constructed with two parallel front legs 182 and 184 adjoining side legs 176 and 178, respectively, and housing therebetween wire reinforcement 146. At the juncture of side leg 178 and front leg 184, a swaged area 186 is shown for further accommodating wire reinforcement 146.

At intervals along a horizontal surface 124, wall anchors 140 are driven into place in the anchor-receiving channels 148. The wall anchors 140 are positioned on surface 124 so that the longitudinal axis of wall anchor 140 is normal to an xy-plane and taps into column 117. The wall anchor 140 extends from a driven end 152 to a driver end or driving end 154. The driven end 152 is constructed with a self-drilling screw portion or threaded portion 156.

Contiguous with screw portion 156 is a dual-diameter barrel with a smaller diameter barrel or first shaft portion 158, with a substantially larger diameter than the threaded portion 156, toward the driven end 152 and a larger diameter barrel or second shaft portion 160 toward the driver end 154. At the juncture of the threaded portion 156 and the first shaft portion 158, an insertion flange 151 is formed, and a stabilizing neoprene fitting or insertion seal 127 is emplaced thereat. At the juncture of barrel portions 158 and 160, a vapor seal flange 162 is formed and a stabilizing neoprene fitting or vapor seal 164 is emplaced thereat. When fully driven into column 117 the screw 156 and barrel portion 158 of wall anchor 140 pierces sheetrock or wallboard 116 and air/vapor barrier 125. The vapor seal 164 is configured to seal the anchor-receiving channel 148 at the insertion point of the wall anchor 140 through the barrier 125. The insulation seal 170 covers the insertion point or insulation flange 168, formed at the junction of the driver portion 166 and the second shaft portion 160, precluding air and moisture penetration therethrough and maintaining the integrity of barrier 125 and insulation 126 by sealing the opening of the anchor-receiving channel 148.

Upon installation into rigid insulation, the larger barrel portion 160 is forced into a press fit relationship with anchor-receiving 148. Stabilization of the stud-type wall anchor 140 is attained by barrel portion 160 and vapor seal 164 completely filling the channel 148 with insulation seal 170 capping the opening 172 of channel 148 into cavity 122 and clamping wall anchor 140 in place. This arrangement does not leave any end play or wiggle room for pin-point loading of the wall anchor 140 and therefore does not loosen over time. With stabilizing fitting or insulation seal 170 in place, the insulation integrity within the cavity wall is maintained. The driver portion 166 is capable of being driven using a conventional chuck and, after being rotated to align with the bed joint 130.

In producing wall anchor 148, the length of the smaller diameter barrel or first shaft portion 158 less the vapor seal 164 height is dimensioned to match the external layer 128 thickness. Similarly, the length of the larger diameter barrel or second shaft portion 160 plus the internal or vapor seal 164 height is dimensioned to match the insulation thickness. The threaded portion 156, the first shaft portion 158, the second shaft portion 160 and the driver portion 166 are constructed of material selected from a group consisting of galvanized steel, hot dip galvanized steel, stainless steel, and bright basic steel.

To provide a thermal break, when the inner wythe 116 is constructed from steel studs or columns 117, between the inner wythe 116 and the outer wythe 118, the insertion seal 127, the insulation seal 170 and the vapor seal 164 are constructed from a high-strength, thermally-insulating polymeric material such as PVC, neoprene, or an equivalent. The present system includes either the insulation seal 170 and the insertion seal 127, the vapor seal 164 and the insertion seal 127, or the insulation seal 170, the insertion seal 127 and the vapor seal 164.

The description which follows is a third embodiment of the anchoring system for insulated cavity walls of this invention. For ease of comprehension, whenever possible similar parts use reference designators 200 units high than those in the first embodiment. Referring now to FIGS. 7 through 10, the third embodiment is shown and referred to generally by the numeral 210.

Figure 7:
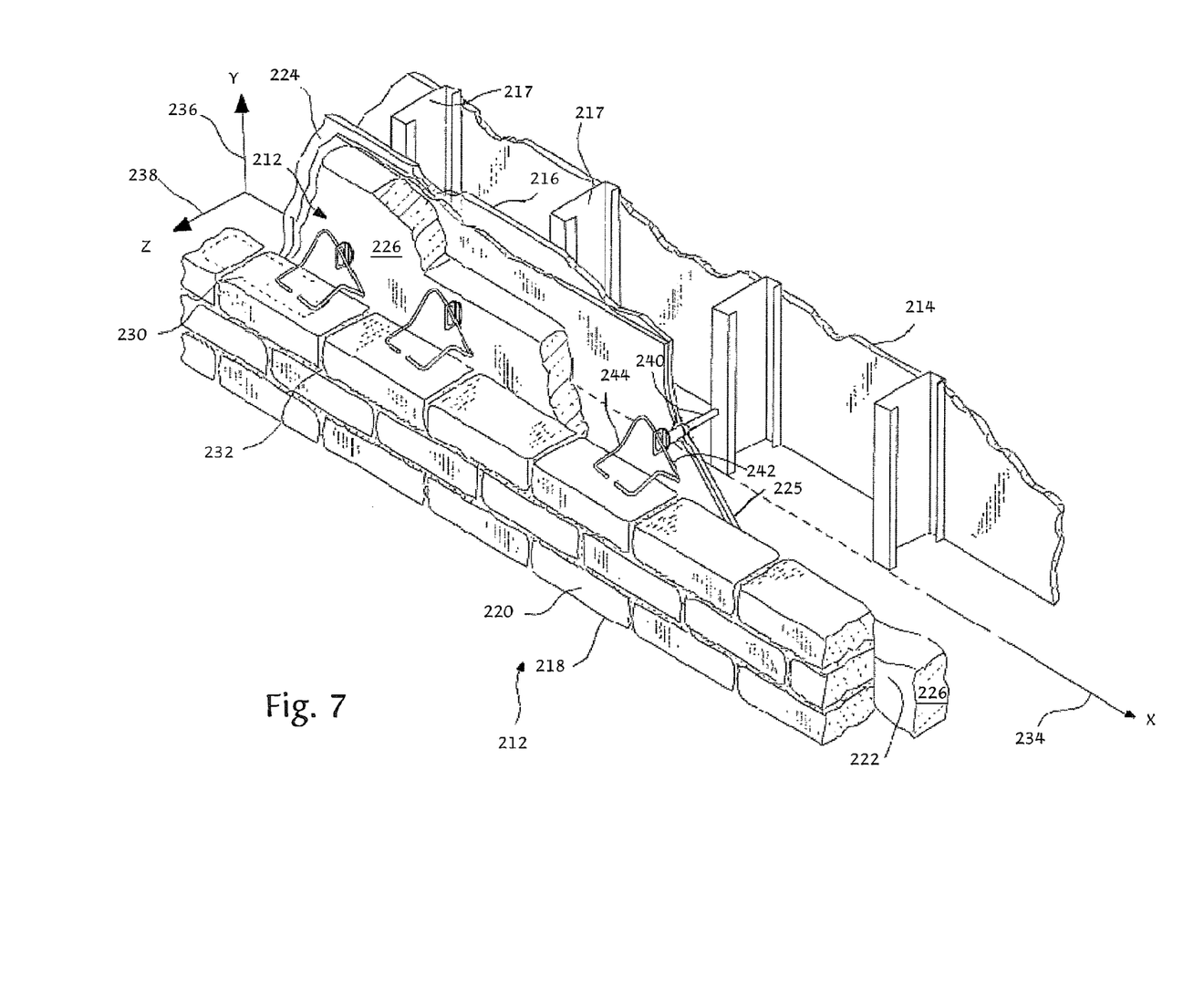
FIG. 7 is a third embodiment of this invention and is a perspective view of an anchoring system similar to FIG. 1, but showing a self-leveling veneer anchor and the wall anchor with an insulation seal and an insertion seal.

A cavity wall structure 212 is shown having an inner wythe or drywall backup 214 with sheetrock or wallboard 216 mounted on metal studs or columns 217 and an outer wythe or facing wall 218 of brick 220 construction. Inner wythes constructed of masonry materials or wood framing (not shown) are also applicable. The cavity 222 has attached to the exterior surface 224 of the inner wythe 214 an air/vapor barrier 225 and insulation 226.

Successive bed joints 230 and 232 are substantially planar and horizontally disposed and, in accord with building standards, are 0.375-inch (approx.) in height. Selective ones of bed joints 230 and 232, which are formed between courses of bricks 220, are constructed to receive therewithin the insertion portion of the veneer anchor hereof. Being threadedly mounted in the inner wythe, the wall anchor is supported thereby and, as described in greater detail hereinbelow, is configured to minimize air and moisture penetration around the wall anchor/inner wythe interface. For purposes of discussion, the cavity surface 224 of the inner wythe 214 contains a horizontal line or x-axis 234 and intersecting vertical line or y-axis 236. A horizontal line or z-axis 238, normal to the xy-plane, passes through the coordinate origin formed by the intersecting x- and y-axes. The anchor 240 is substantially the same as the anchor 140 described in the second embodiment, above.

Figure 8:
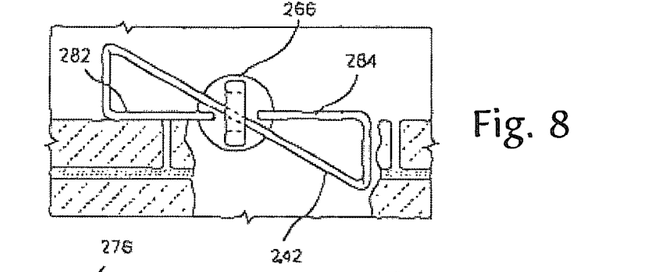
FIG. 8 shows a perspective view of a detail of FIG. 7 that includes the wall anchor and the self-leveling veneer anchor.
Figure 9:
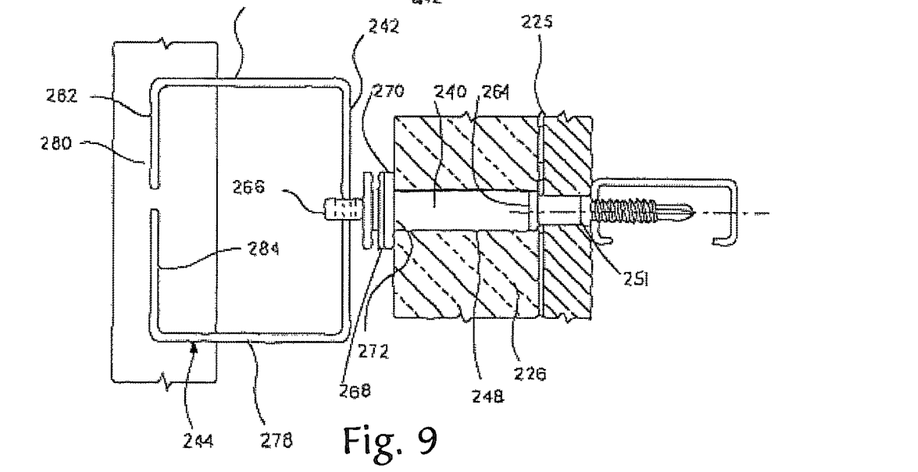
FIG. 9 is a cross sectional view of FIG. 7 taken along an xz-plane including the longitudinal axis of the wall anchor; and, FIG. 10 is a cross-sectional view of FIG. 7 taken along a yz-plane including the longitudinal axis of the wall anchor.
Figure 10:
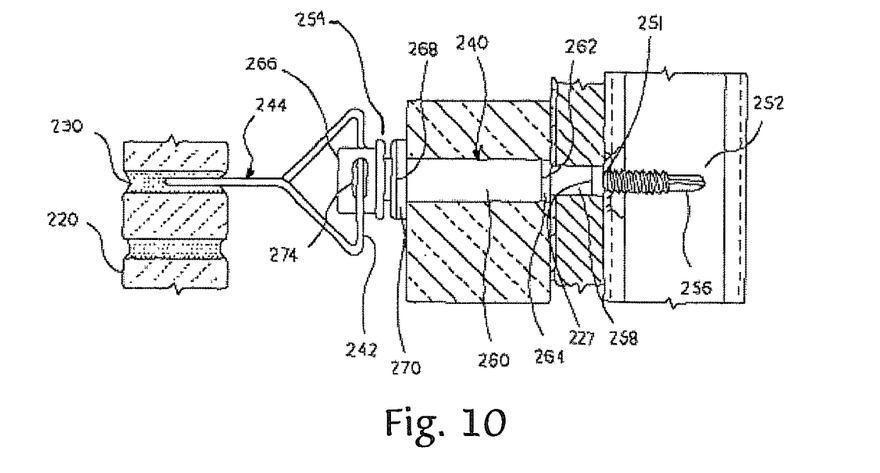

The veneer tie 244 is a self-leveling tie and corrects slight misalignment between wall anchor and bed joint levels. The veneer tie 244 is shown in FIGS. 8, 9 and 10 as being emplaced on a course of bricks 220 in preparation for embedment in the mortar of bed joint 230. As shown in this embodiment, the system does not include a wire or outer wythe reinforcement (46, FIG. 1), but could easily be modified to incorporate the same.

At intervals along a vertical surface 224, wall anchors 240 are driven into place in the anchor-receiving channels 248. The wall anchors 240 are positioned on surface 224 so that the longitudinal axis of wall anchor 240 is normal to and taps into the backup wall 214. As best shown in FIGS. 9 and 10, the wall anchor 240 extends from a driven end 252 to a driver or driving end 254. The driven end 252 is constructed with a self-drilling screw portion or threaded portion 256.

Contiguous with screw portion 256 is a dual-diameter barrel with a smaller or first diameter barrel or first shaft portion 258 toward the driven end 252 and a larger diameter or second diameter barrel or second shaft portion 260 toward the driver end 254. At the juncture of the screw portion 256 and the first shaft portion 260, an insertion flange 251 is formed and a stabilizing, thermally-isolating compressible fitting or insertion seal 227 is emplaced thereat. At the juncture of barrel portions 258 and 260, a vapor seal flange 262 is formed and a stabilizing thermally-isolating compressible fitting or vapor seal 264 is emplaced thereat. When fully driven into the inner wythe 214, the vapor seal 264 and barrel portion 260 of wall anchor 240 are drawn into the insulation 226. Further, the seal 264 abuts the insertion point precluding air and moisture penetration thereinto.

At the driving end 254, a driver portion 266 adjoins larger diameter barrel or second shaft portion 260 forming an insulation flange 268 therebetween and another stabilizing thermally-isolating compressible fitting or insulation seal 270 is emplaced thereat. Upon installation into rigid insulation, the larger barrel portion 260 is forced into a press fit relationship with anchor-receiving channel 248. Stabilization of this stud-type wall anchor 240 is attained by barrel portion 260 and vapor seal 264 completely filling the channel 248 with insertion seal 270 capping the opening 272 of channel 248 into cavity 222 and clamping wall anchor 240 in place. With stabilizing fitting or insulation seal 270 in place, the insulation integrity within the cavity wall is maintained.

The threaded portion 256, the first shaft portion 258, the second shaft portion 260 and the driver portion 266 are constructed of material selected from a group consisting of galvanized steel, hot dip galvanized steel, stainless steel, and bright basic steel. To provide a thermal break, when the inner wythe 216 is constructed from steel studs or columns 217, between the inner wythe 216 and the outer wythe 218, the insertion seal 227, the insulation seal 270 and the vapor seal 264 are constructed from a high-strength, thermally-insulating polymeric material such as PVC, neoprene, or an equivalent.

Here, the veneer tie 244 is a wire formative having a rear leg 242 set at an angle to the front legs. In this embodiment, the driver portion 266 has an elongated aperture 274 for the interlacing of veneer tie 244. From the rear leg 242, two side legs 276 and 278 extend to and, at the front portion thereof, are part of insertion portion 280. Because of the angular displacement, one of the side legs extends upwardly to the insertion portion; and the other, downwardly. The insertion portion 280 is constructed with two front legs 282 and 284 adjoining side legs 276 and 278, respectively. The veneer tie 244 is self-leveling as, upon insertion into bed joint 230, the position along rear leg 242 of aperture 274 is established.

In the above description of anchoring systems for insulated cavity walls of this invention various configurations are described and applications thereof in corresponding settings are provided. Because varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense. Thus minor changes may be made without departing from the spirit of the invention.

What is claimed is:

1. An anchoring system for use in an insulated cavity wall having an inner wythe and an outer wythe with a cavity therebetween, the outer wythe formed from a plurality of successive courses with a bed joint between each two adjacent courses, the inner wythe having an exterior layer with rigid insulation disposed thereon, the insulation having an anchor-receiving channel therethrough extending from the exterior layer and opening onto the cavity, the anchoring system comprising, in combination:
    a wall anchor having an elongated body extending along a longitudinal axis from a driven end to a driving end, the wall anchor, in turn, comprising:
        a threaded portion at the driven end of the elongated body;
        a first shaft portion of a predetermined length contiguous with the threaded portion and extending therefrom toward the driving end, the first shaft portion having a substantially larger diameter and forming an insertion flange;
        a second shaft portion contiguous with the first shaft portion and extending therefrom toward the driving end, the second shaft portion having a substantially larger diameter and forming a vapor seal flange therebetween, the second shaft portion dimensioned with a diameter for a press fit relationship with the anchor-receiving channel;
        a driver portion at the driving end contiguous with the second shaft portion and forming an insulation flange therebetween;
        an insertion seal disposed on the wall anchor at the insertion flange;
        an insulation seal disposed on the wall anchor at the insulation flange, the insulation seal configured to seal the opening of the anchor-receiving channel; and,
    a veneer tie in an interlocking relationship with the wall anchor;
    whereby the insertion seal and the insulation seal have a press fit relationship with the anchor-receiving channel limiting the lateral displacement of the wall anchor thereby precluding pinpoint loading.

2. The anchoring system of claim 1 wherein the external layer of the inner wythe further comprises an air/vapor barrier disposed thereon and wherein the anchoring system further comprises a vapor seal configured to seal the anchor-receiving channel at the insertion point of the wall anchor through the air/vapor barrier.

3. The anchoring system of claim 2 wherein the vapor seal and the second shaft portion at the vapor seal flange have a combined length along the longitudinal axis dimensioned to be coextensive with the anchor-receiving channel.

4. The anchoring system of claim 3 wherein the insertion seal, the insulation seal and the vapor seal are thermally isolating fittings.

5. The anchoring system of claim 1 wherein the threaded portion, the first shaft portion, the second shaft portion and the driver portion are constructed of material selected from a group consisting of galvanized steel, hot dip galvanized steel, stainless steel, and bright basic steel.

6. The anchoring system of claim 1 wherein the driver portion further comprises:
    a bolt having a head;
    a washer for mounting under the head of the bolt; and,
    a wingnut captured between the washer and the insulation seal, the wingnut having two coplanar elongated apertures therethrough for receiving the veneer tie, the wingnut being angularly adjustable for receiving the veneer tie.

7. The anchoring system of claim 6 wherein the veneer tie further comprises:
    an insertion portion configured for disposition in the bed joint of the outer wythe, the insertion portion having a swaged side leg;
    a reinforcement wire disposed in the swaged side leg and configured for disposition in the bed joint of the outer wythe; and,
    two pintle-shaped rear legs for insertion in the elongated apertures of the driver portion.

8. The anchoring system of claim 1 wherein the driver portion further comprises an elongated aperture therethrough for receiving the veneer tie.

9. The anchoring system of claim 8 wherein the veneer tie further comprises:
    an insertion portion configured for disposition in the bed joint of the outer wythe, the insertion portion having a swaged side leg;
    a reinforcement wire disposed in the swaged side leg of the veneer tie and configured for disposition in the bed joint of the outer wythe; and,
    a U-shaped rear leg for insertion in the elongated aperture of the driver portion thereby enabling angular adjustment to any shaft position.

10. An anchoring system for use in an insulated cavity wall having an inner wythe and an outer wythe with a cavity therebetween, the outer wythe formed from a plurality of successive courses with a bed joint between each two adjacent courses, the inner wythe formed from a drywall backup wall mounted on metal studs or columns having an exterior layer with an air/vapor barrier and insulation disposed thereon, the anchoring system comprising, in combination:

a wall anchor having an elongated body extending along a longitudinal axis from a driven end to a driving end, the wall anchor, in turn, comprising:
a self-drilling threaded portion at the driven end of the elongated body;
a first shaft portion of a predetermined length contiguous with the threaded portion and extending therefrom toward the driving end, the first shaft portion having a substantially larger diameter and forming an insertion flange;
a second shaft portion contiguous with the first shaft portion and extending therefrom toward the driving end, the second shaft portion having a substantially larger diameter and forming a vapor seal flange therebetween;
a driver portion at the driving end contiguous with the second shaft portion and forming an insulation flange therebetween, the driver portion configured, upon installation, to form a channel for the anchor in the insulation, the channel extending from the exterior layer and opening onto the cavity;
a vapor seal disposed on the wall anchor at the vapor seal flange, the vapor seal and the second shaft portion at the vapor seal flange having a combined length along the longitudinal axis to be coextensive with the channel in the insulation, the vapor seal configured to seal the channel at the insertion point of the wall anchor through the air/vapor barrier;
an insertion seal disposed on the wall anchor at the insertion flange; and, a veneer tie in an interlocking relationship with the wall anchor, the veneer tie having an insertion portion configured for embedment in the bed joint of the outer wythe; whereby the second shaft portion is driven into a press fit relationship with the channel limiting the lateral displacement thereof.

11. The anchoring system of claim 10 wherein the wall anchor further comprises an insulation seal disposed on the wall anchor at the insulation flange, the insulation seal configured to seal the opening of the channel.

12. The anchoring system of claim 11 wherein the insertion seal, the vapor seal and the insulation seal are thermally isolating neoprene fittings.

13. The anchoring system of claim 10 wherein the self-drilling threaded portion, the first shaft portion, the second shaft portion and the driver portion are constructed of material selected from a group consisting of galvanized steel, hot dip galvanized steel, stainless steel, and bright basic steel.

14. The anchoring system of claim 10 wherein the driver portion further comprises:
a bolt having a head;
a washer for mounting under the head of the bolt; and,
a wingnut captured between the washer and the insulation seal, the wingnut having two coplanar elongated apertures therethrough for receiving the veneer tie, the wingnut being angularly adjustable for receiving the veneer tie.

15. The anchoring system of claim 10 wherein the driver portion further comprises an elongated aperture therethrough for receiving the veneer tie.

16. An anchoring system for use in an insulated cavity wall having an inner wythe and an outer wythe with a cavity therebetween, the outer wythe formed from a plurality of successive courses with a bed joint between each two adjacent courses, the inner wythe having an air/vapor barrier and insulation disposed thereon, the anchoring system comprising, in combination:
a wall anchor having an elongated body extending along a longitudinal axis from a driven end to a driving end, the elongated body having a dual diameter with a first diameter and a second diameter, the wall anchor, in turn, comprising:
a threaded portion at the driven end of the elongated body;
a first shaft portion of the first diameter contiguous with the threaded portion and extending therefrom toward the driving end, the first shaft portion having a substantially larger diameter and forming an insertion flange;
a second shaft of the second diameter portion contiguous with the first shaft portion and extending therefrom toward the driving end, forming a vapor seal flange between the first shaft portion and the second shaft portion;
a driver portion at the driving end contiguous with the second shaft portion and forming an insulation flange therebetween;
a vapor seal disposed at the vapor seal flange;
an insertion seal disposed on the insertion flange;
an insulation seal disposed on the insulation flange; and,
a veneer tie in an interlocking relationship with the wall anchor, the veneer tie having an insertion portion configured for embedment in the bed joint of the outer wythe.

17. The anchoring system of claim 16 wherein the threaded portion, the first shaft portion, the second shaft portion and the driver portion are constructed of material selected from a group consisting of galvanized steel, hot dip galvanized steel, stainless steel, and bright basic steel.

18. The anchoring system of claim 16 wherein the insertion seal, the vapor seal and the insulation seal are thermally isolating, compressible fittings.

19. The anchoring system of claim 16 wherein the driver portion further comprises an elongated aperture therethrough for receiving the veneer tie.

20. The anchoring system of claim 19 wherein the veneer tie is a box tie with a rear leg set at an angle to the front leg adapted, upon insertion in the bed joint, to be self-leveling, thereby compensating for slight misalignment between the wall anchor installation and the level of the bed joint.

* * * * *